US008455136B2

(12) United States Patent
Ishida et al.

(10) Patent No.: US 8,455,136 B2
(45) Date of Patent: Jun. 4, 2013

(54) ELECTROCHEMICAL DEVICE

(75) Inventors: Katsuei Ishida, Gunma (JP); Kazushi Yawata, Gunma (JP); Naoto Hagiwara, Gunma (JP); Motoki Kobayashi, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 42 days.

(21) Appl. No.: 12/538,498

(22) Filed: Aug. 10, 2009

(65) Prior Publication Data

US 2011/0033745 A1 Feb. 10, 2011

(51) Int. Cl.
*H01M 2/00* (2006.01)

(52) U.S. Cl.
USPC .......................................... 429/178; 429/136

(58) Field of Classification Search
USPC ................... 429/178, 127, 133, 136, 162, 163
See application file for complete search history.

(56) References Cited

U.S. PATENT DOCUMENTS

| 2004/0161664 A1* | 8/2004 | Hanafusa et al. ............. 429/162 |
| 2007/0009795 A1* | 1/2007 | Otohata et al. ................ 429/185 |
| 2007/0264535 A1* | 11/2007 | Lee et al. ........................... 429/7 |
| 2009/0162732 A1* | 6/2009 | Noblet et al. .................... 429/35 |
| 2011/0117394 A1* | 5/2011 | Hwang et al. ..................... 429/7 |
| 2011/0143185 A1* | 6/2011 | Nishikawa ..................... 429/145 |

FOREIGN PATENT DOCUMENTS

| JP | H07-29607 Y2 | 7/1995 |
| JP | H11-297280 A | 10/1999 |
| JP | 2001-060453 A | 3/2001 |
| JP | 2002-245999 A | 8/2002 |
| JP | 2005-310882 A | 11/2005 |
| JP | 2006-278263 A | 10/2006 |

OTHER PUBLICATIONS

Japanese Office Action issued on Apr. 26, 2012, in a counterpart Japanese patent application No. 2008-022908.
Response (including the amendment and the remarks) submitted on Jun. 29, 2012, to the Office Action listed as Non-Patent Literature document No. 1 above.
Examiner's Decision of Refusal mailed on Jul. 17, 2012, to the Response listed as Non-Patent Literature document No. 2 above.
Request for Trial against Examiner's Decision of Refusal, submitted on Oct. 12, 2012, listed as Non-Patent Literature document No. 3 above.

\* cited by examiner

*Primary Examiner* — Mark F Huff
*Assistant Examiner* — Monique Wills
(74) *Attorney, Agent, or Firm* — Chen Yoshimura LLP

(57) ABSTRACT

An electrochemical device capable of being mounted by soldering includes a film package made of a film; an electrodes part encapsulated together with an electrolyte in said film package; a pair of terminals, one end of each terminal being connected to said electrodes part and another end of each terminal being exposed to an exterior of said film package; and an armor in contact with a substantially entire surface of said film package and in contact with partial surfaces of the exposed ends of said pair of terminals, respectively, to encapsulate said film package, said armor exposing remaining portions of said pair of terminals to an exterior of the armor.

18 Claims, 6 Drawing Sheets

ELECTROCHEMICAL DEVICE

This application hereby incorporates by reference a Japanese patent application No. 2008-022908, filed in Japan on Feb. 1, 2008.

BACKGROUND OF THE INVENTION

1. Field of the Invention

The present invention relates to an electro-chemical device, which has a film package. More particularly, the present invention relates to an electro-chemical device capable of being processed with reflow soldering using a lead-free solder.

2. Description of the Related Art

A film package is used in various electro-chemical devices, such as an electric double-layer capacitor, a Lithium ion capacitor, a redox capacitor, and a Lithium ion battery.

The schematic structure of an electric double-layer capacitor, which is representative of these electrochemical devices, is explained. In an electric double layer capacitor in general, an electrodes part is encapsulated with an electrolyte covered by a package, which is formed of laminated films. The electrodes part is formed by stacking a set of layers of a thin polarized electrode for a positive electrode, a thin film separator, and a thin polarized electrode for a negative electrode one after another. Moreover, the electric double-layer capacitor has one terminal (a positive terminal) electrically connected to the aforementioned polarized electrode for a positive electrode, and another terminal (a negative terminal) electrically connected to a polarized electrode for a negative electrode. Both terminals are exposed to the exterior of the film package.

The electric double-layer capacitor is manufactured by the following method, for example. First, a rectangular laminated film of a predetermined size is prepared. The laminated film is formed by laminating a plastic protective layer, a metal barrier layer, and a plastic heat-seal layer one on top of the other. Next, the aforementioned electrodes part permeated with an electrolyte is laid out on the side of the heat-seal layer of the laminated film. The aforementioned laminated film is folded so that the laminated film covers the aforementioned electrodes part, and at the same time, the positive terminal and the negative terminal are exposed to the exterior of the laminated film. Then, the aforementioned film package is formed by putting together the edges of the heat seal layer at three open sides of the laminated film, and by heat-sealing the respective edges of the laminated film.

Following the trend of miniaturizing various electrochemical devices, such as the above-mentioned electric double-layer capacitor, in recent years, it is desired that electrochemical devices be mounted on a circuit board by reflow soldering using a lead-free solder in the same manner as that for general electronics parts. That is, there exists a demand for electrochemical devices capable of being processed with reflow soldering using a lead-free solder.

However, in conventional electrochemical devices having a film package, the film package is not suitable for reflow soldering using lead-free solder. In fact, in conventional electrochemical devices, the film package exhibits expansion and deformation as a result of the heat transferred to the electrochemical device in reflow soldering, (for example, by an increased vapor pressure of the electrolyte), when the devices is subject to a reflow soldering process in a reflow oven at a high temperature (at 250° C. for example). Because of the expansion and the deformation, the electrochemical devices are susceptible to various failures, such as leaking of the electrolyte or breaking of the film package.

Japanese Laid-Open Patent Application Publication No. 2002-245999 discloses a structure of an enclosed electrochemical device having a film package in a case. But, because the case does not prevent the film package from the heat expansion and the deformation, the electrochemical device is susceptible to similar or same failure modes as described above.

SUMMARY OF THE INVENTION

An object of the present invention is to provide an electrochemical device that is suitable for a reflow soldering process.

Another object to the present invention is to provide an electrochemical device that is suitable for a reflow soldering process using a lead-free solder.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present invention provides an electrochemical device suitable for soldering process for mounting, including a film package formed by films, an electrodes part encapsulated together with an electrolyte in the film package, a pair of terminals, one end of each terminal being connected to the electrodes part and another end of each terminal being exposed to an exterior of the film package, and an armor (a protective outer package) closely contacting a surface of the film package to cover the entire film package, the armor being in tight contact with a surface of the terminals so as to cover a part of the respective surfaces of the terminals.

The armor (the protective outer package) of this device is in tight contact with a surface of a film package and covers an entire film package. Also the armor is in tight contact with a surface of each terminal and covers a part of the surface of the terminal. Because of this, excessive heat expansion and deformation of the film package can be prevented even if the heat in the reflow soldering is transferred to the film package through an armor (a protective outer package). This makes it possible to substantially prevent failure of the film package due to a leak of the electrolyte and breaking of the film package. Furthermore, the armor (the protective outer package) can suppress the heat transfer to the film package. Therefore, the armor can alleviate effects of the heat on the film package and its interior during reflow soldering.

As described above, according to this aspect of the present invention, there is provided an electrochemical device which is capable of being processed with reflow soldering at a high temperature using a lead-free solder. Accordingly, the electrochemical device can be mounted on a circuit board, etc., by reflow soldering using a lead-free solder in the same manner as that for general electronics parts.

In another aspect, the present invention provides an electrochemical device capable of being mounted by soldering, including a film package made of a film; an electrodes part encapsulated together with an electrolyte in said film package; a pair of terminals, one end of each terminal being connected to said electrodes part and another end of each terminal being exposed to an exterior of said film package; and an armor in contact with a substantially entire surface of said film package and in contact with partial surfaces of the exposed ends of said pair of terminals, respectively, to encapsulate said film package, said armor exposing remaining portions of said pair of terminals to an exterior of the armor.

It is to be understood that both the foregoing general description and the following detailed description are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE PREFERRED EMBODIMENTS

In the following, preferred embodiments of the present invention will be explained in detail with reference to attached figures.

Figure 1:
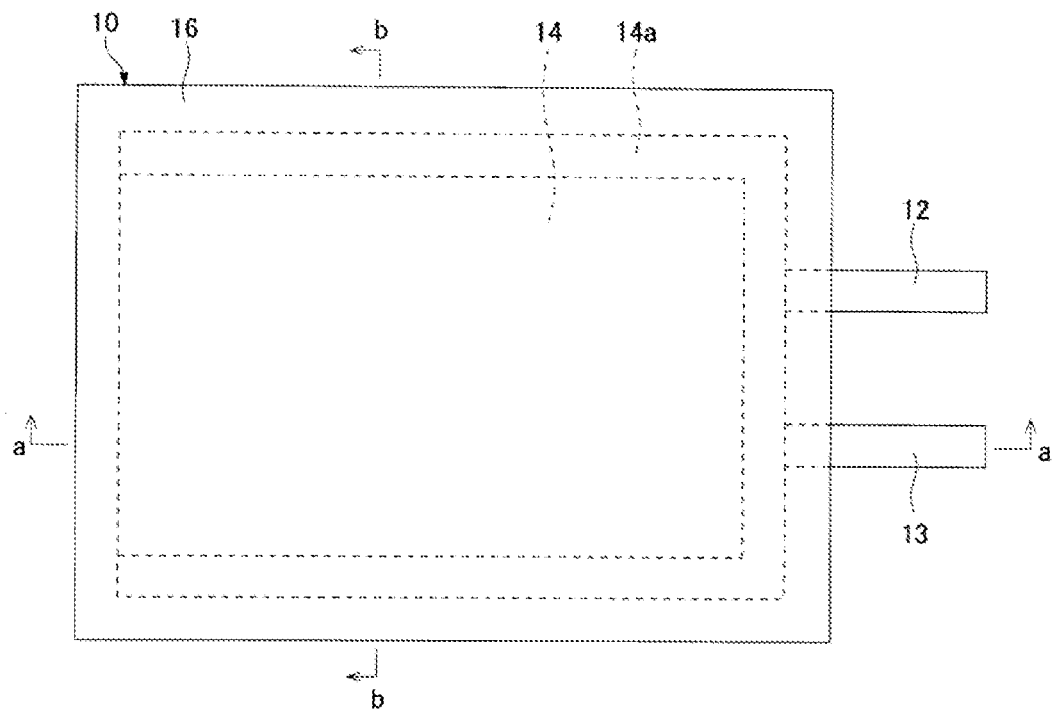
FIG. 1 is a plan view of an electric double-layer capacitor showing an embodiment of the present invention as applied to an electric double-layer capacitor.
Figure 2:
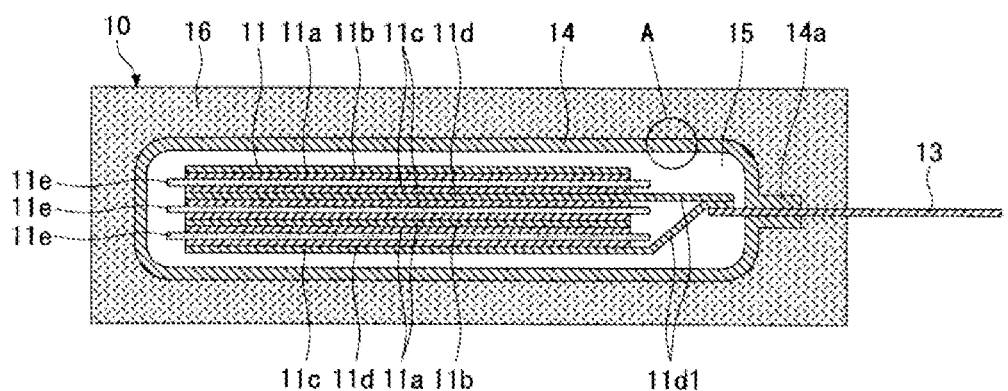
FIG. 2 is a cross-sectional view of the electric double-layer capacitor taken along the line a-a in FIG. 1.
Figure 3:
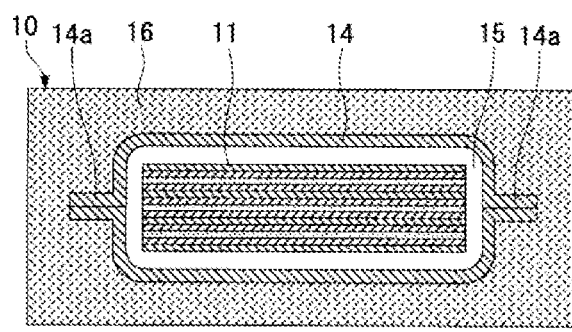
FIG. 3 is a cross-sectional view of the electric double-layer capacitor taken along the line b-b in FIG. 1.
Figure 4A:
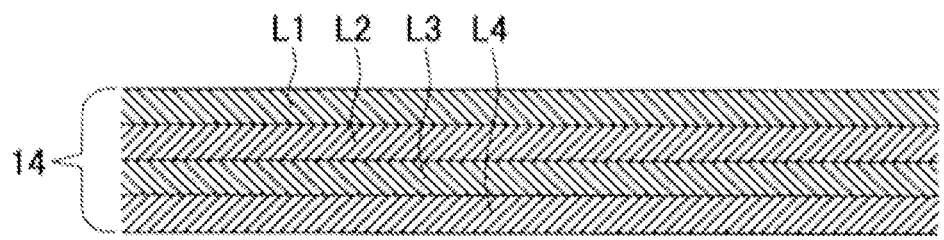
FIGS. 4A-4C respectively shows various examples of the part A in FIG. 2.
Figure 4B:
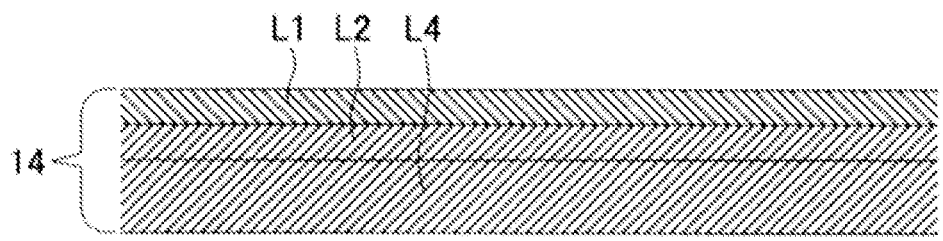
Figure 4C:

FIG. 1-FIG. 4C show embodiments of an electric double-layer capacitor according to the present invention. FIG. 1 is a plan view of an electric double-layer capacitor. FIG. 2 is a cross-sectional view taken along the line a-a in FIG. 1. FIG. 3 is a cross sectional view taken along the line b-b in FIG. 1. FIGS. 4A-4C respectively show various examples of the part A of FIG. 2.

The electric double-layer capacitor 10 has an electrodes part 11, a pair of terminals (a positive terminal 12 and a negative terminal 13, for example), a film package 14, an electrolyte 15, and an armor 16, as major structural elements.

The electrodes part is composed by stacking positive electrodes and negative electrodes one after another, separated by separators 11e. The positive electrode is formed by stacking a polarized electrode for a positive electrode 11a, a collecting element for a positive electrode 11b, and a polarized electrode for a positive electrode 11a in that order. In a similar way, the negative electrode is formed by stacking a polarized electrode for a negative electrode 11c, a collecting element for a negative electrode 11d, and a polarized electrode for a negative electrode 11c one after another. For convenience in showing various elements in the drawing, FIG. 2 shows two stacked units each of which is made of a positive electrode, a separator 11e, and a negative electrode. However, the actual number of such units may vary depending on the demand as long as the electric double-layer capacitor includes at least one such a unit. In this example, the collecting elements are placed in the uppermost layer and in the lowermost layer, respectively. However, a polarized electrode or a separator may be added on these collecting elements.

As shown in FIG. 2, at each end of the collecting elements 11d for a negative electrode, a connecting piece 11d1 is installed. Each connecting piece 11d1 is connected to one end of a negative electrode 13. In a similar way, although not shown in FIG. 2, at each end of the collecting elements 11b for a positive electrode, a connecting piece 11b1 is installed. Each connecting piece 11b1 is connected to one end of a positive electrode 12. The positive electrode 12 and the negative electrode 13 are laid out to be non-contacting to each other. As shown in FIGS. 1 and 2, the other side of each terminal is protruded through a film package 14.

The film package 14 may be made of a film that can be heat-sealed. There are several possible options. As shown in FIG. 4A, the film package may be a laminated film that is composed of a protection layer L1 made of plastic such as nylon, etc., a barrier layer L2 made of a metal such as aluminum, etc., an insulation layer L3 made of a plastic such as polyethylene terephthalate, etc., and a heat-seal layer L4 made of polypropylene, etc., which are laminated in that order (referred to as "Example 1"). Alternatively, as shown in FIG. 4 B, the film package may be a laminated film which is composed of a protection layer L1 made of plastic such as nylon, etc., a barrier layer L2 made of a metal such as Aluminum, etc., and a heat-seal layer L4 made of polypropylene, etc. one on top of other (referred to as "Example 2"). Further, as shown in FIG. 4C, the film package may be a non-laminated film, which is composed of only a single heat-seal layer L4 made of polypropylene, etc. (referred to as "Example 3"). The film package 14 can be deformed or appropriately shaped depending on the needs. Various combinations of these Examples are also possible.

The film package 14 may be formed by the following steps: preparing a rectangular film of a predetermined size; laying out an electrodes part 11 impregnated with an electrolyte on the side of the heat-seal layer L4 of that film; covering the electrodes part 11 with the film by folding the film into two at the opposite side of the positive electrode 12 and the negative electrode 13 such that a pair of the terminals (a positive electrode 12 and a negative electrode 13) protrudes towards the exterior and by heat sealing three open sides of the heat seal layer L4 of the film (see the heat-sealed part 14a in FIG. 1). Here, the electrolyte 15 is explained to be impregnated beforehand in the electrodes part 11. Alternatively, the electrolyte 15 may be filled through a preformed hole in the film package, followed by sealing the hole.

The barrier layer L2 in the aforementioned laminated film Example 1 has functions of preventing leakage of the electrolyte from the film package, and preventing water from entering into the film package, etc. It is preferable that the barrier layer L2 be made of metal such as aluminum, or a metal oxide such as $Al_2O_3$.

The insulation layer L3 in the aforementioned laminated film Example 1 has a function of preventing the barrier layer L2 from being exposed when a heat-seal layer L4 is melt down in the process of heat-sealing. In case of using the aforementioned laminated film Example 2, which does not have the insulation layer L3, it is preferable that the heat-seal layer L4 be made thick enough to prevent the barrier layer L2 from being exposed when the heat-seal layer L4 is melt down in a process of heat-sealing. For similar reasons, in the aforementioned non-laminated film Example 3, which is composed of a single heat-seal layer, it is preferable that the thickness of the heat-seal layer L4 is large enough, as shown in FIG. 4C.

Armor 16 covering the external surface of the film package 14 preferably has a higher strength than a film that constitutes the film package 14. For example, the armor 16 is formed in a rectangular block-shaped and is made of, for example, (a) a ceramics such as an alumina, (b) a metal with surface insulation, for example, an alloy or a cold rolled metal such as a cold rolled Aluminum, or (c) a plastic or resin, such as epoxy resin, aramid resin and/or a polyimide resin. Various combinations of these materials, layered or laminated, or section-divided, etc., are also possible.

The manufacturing method of the armor 16 varies on the kind of the material. In the case of using the aforementioned material (c), the armor may be formed by the following steps: preparing a mold (not shown in drawings) which has a cavity in the shape of the desired rectangular block; inserting the film package 14 in the mold cavity such that the ends of the positive and negative terminals 12 and 13 are exposed to the exterior of the cavity (at around the center of the opening of the cavity); injecting a fluid armor material into the cavity; hardening the fluid armor material; and thereafter taking out the resulting structure from the cavity. As shown in FIGS. 2 and 3, the armor 16 covers the film package 14 in tight contact with the entire surface thereof. The armor 16 also is in tight contact with the pair of exposed terminals (the positive terminal 12 and the negative terminal 13, for example), and covers portions of the surfaces of the negative and positive terminals 12 and 13.

In mounting the aforementioned electric double-layer capacitor 10 by reflow soldering using a lead free solder, a pair of terminals (a positive electrode 12 and a negative electrode 13, for example), which protrudes from the armor 16, are bent as necessary. Then, for example, a creamy solder is painted on the land portions on which the positive and negative terminals 12 and 13 are to be mounted, respectively, and the electric double-layer capacitor is disposed thereon. Lastly, the electric double-layer capacitor 10 and the wiring board are inserted into a reflow oven which is raised to a high temperature (at about 250° C., for example).

According to this embodiment, the armor 16 is in tight contact with the film package 14 to cover the package 14. Also, the armor 16 is in closed contact with the surfaces of the positive and negative terminals 12 and 13, and covers respective portions of the positive terminal 12 and the negative terminal 13. Therefore, heat expansion and deformation of the film package 14 can be suppressed by using the armor 16 even if the heat in the reflow soldering is transferred to the film package 14 through the armor 16. This makes it possible to prevent various failure modes, such as leaking of the electrolyte or breaking of the film package.

Furthermore, the armor 16 covering the entire film package 14 has a function of suppressing heat transfer to the film package 14. Thus, the armor can alleviate the effect of the heat on the film package and its content during reflow soldering. This effect is more prominent when the thermal conductivity of the armor 16 is smaller than the thermal conductivity of the film constituting the film package 14 in the thickness direction.

The thermal conductivity of the armor 16 in the thickness direction, and the thermal conductivity of the film that constitutes the film package 14 in the thickness direction can be measured in accordance with JIS-A1412-1 "A measurement method of a coefficient of thermal conductivity of a heat insulator."—Chapter 1: "Guarded hot plate method" (GHP method), for example. The thermal conductivity can also be measured using Thermal Conductivity Measurement Apparatus HC-110 manufactured by Eko Instrument Inc., for example.

Thus, according the embodiment of the present invention, it is possible to provide an electric double-layer capacitor 10 that can be processed by reflow soldering at a high temperature using a lead-free solder. Thus, the electric double layer capacitor 10 can be mounted on a circuit board, etc., by reflow soldering using a lead-free solder in the same manner as that for general electronics components.

In the following, referring to FIG. 5-FIG. 9, modified examples of the above-described embodiments will be explained.

First Modification

Figure 5:
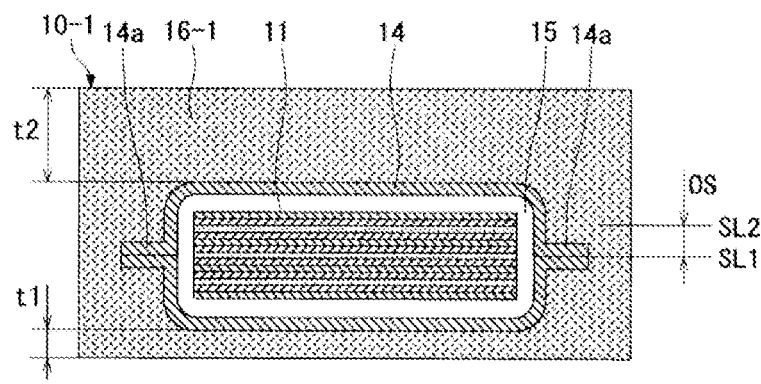
FIG. 5 is a cross-sectional view of an electric double-layer capacitor according to a first modification of the embodiment, taken in the same manner as in FIG. 3.

FIG. 5 is a cross-sectional view of an electric double-layer capacitor. The cross-sectional view is taken in the same manner as in FIG. 3.

This electric double-layer capacitor 10-1 has a different structure from that of the electric double-layer capacitor 10 shown in FIGS. 1-4 in that the vertical center SL1 of the film package 14 is shifted downwardly from the vertical center SL2 of the armor 16-1 by a predetermined amount OS. In more detail, the thickness t2 of a portion of the armor 16-1 that covers the principal surface (the top surface, for example) of the film package 14 is made larger than the thickness t1 of a portion of the armor 16-1 that covers the side of another principal surface (the bottom surface, for example) of the film package 14. Hence, the electric double-layer capacitor 10-1 is made asymmetric in the vertical direction. The rest of the structure is the same as that of the electric double-layer capacitor 10 shown in FIGS. 1-4. Thus the same notations are used for like and same components, and their descriptions are not repeated here.

In the electric double-layer capacitor 10-1, the vertical center SL1 of the film package 14 is shifted downwardly from the vertical center SL2 of the armor 16-1. And, the thickness t2 of the armor 16-1 covering the top surface of the film package 14 is larger than the thickness t1 of the armor 16-1 covering a bottom surface of a film package 14. Accordingly, heat transfer from the top of the armor 16-1 to the film package 14 can be suppressed more effectively, and the effect of heat on the film package 14 and its contents can be reduced more effectively. Furthermore, the thickness t1 of the armor 16-1 covering the bottom surface of the film package 14 is smaller than that in the above example. As a result, heat, which has been transferred to the film package 14 during the reflow soldering, can be easily discharged to the board underneath, etc. from the bottom surface of the armor 16-1. For this additional reason, the adverse effects of heat on the film package 14 and its contents are further alleviated.

Second Modification

Figure 6A:
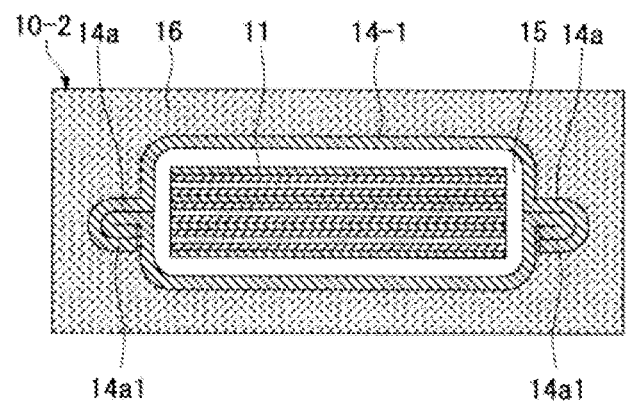
FIG. 6A is a cross-sectional view of an electric double-layer capacitor according to a second modification of the embodiment, taken in the same manner as in FIG. 3.

FIG. 6A shows a second modification of the embodiment. This figure is a cross-sectional view of an electric double-layer capacitor taken in the same manner as in FIG. 3. An electric double-layer capacitor 10-2 shown in the figure is formed in a similar way as the aforementioned electric double-layer capacitor in a sense that the side edges of the two films of the film package 14-1 are heat-sealed for encapsulation to constitute the heat seal part 14a This electric double-layer capacitor 10-2 has a different structure from that of the electric double-layer capacitor 10 shown in FIGS. 1-4 in that a folded part 14a1 is formed in each of the heat-seal parts 14a. Because the rest of the structure is the same as that of the electric double-layer capacitor 10 shown in FIGS. 1-4, the same notations are used for the same or like components, and the descriptions therefor are not repeated here.

In the electric double-layer capacitor 10-2, by having the folded part 14a1, the strength of the heat-seal part can be supplemented. Furthermore, because the folded part 14a1 is covered by the armor in tight contact therewith, thermal deformation of the heat-seal parts during the reflow soldering process can be effectively suppressed.

Figure 6B:
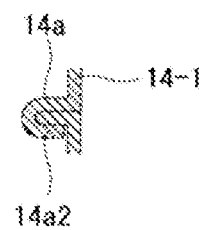
FIG. 6B is a modification of FIG. 6A.

FIG. 6B shows a further modification of the folded part. Here, the film package is made of the above-mentioned non-laminated film Example 3, for example. As in above examples, the side edges of the film are heat-sealed. A folded part 14a2 is formed by folding an protruding end of one layer of the film over the other layer of the film so that the folded-over part wraps around the other layer of the film. The effects of having the folded part 14a2 are similar to those for the folded part 14a1.

Third Modification

Figure 7:
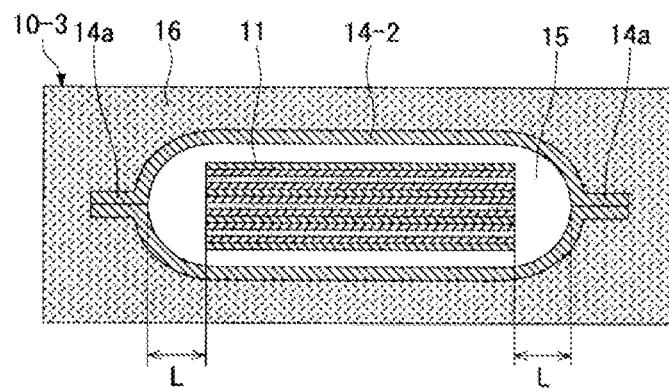
FIG. 7 is a cross-sectional view of an electric double-layer capacitor according to a third modification of the embodiment, taken in the same manner as in FIG. 3.

FIG. 7 shows a third partially modified embodiment. This figure is a cross-sectional view of an electric double-layer capacitor, taken in the same manner as in FIG. 3.

An electric double-layer capacitor 10-3, which is shown in FIG. 7, has a structure different from that of the electric double-layer capacitor 10 shown in FIGS. 1-4 in that a film package 14-2 has dimensions larger than the electrodes part 11 in width and length such that there is a distance L between the side wall of the electrodes part 11 and the farthest inner wall of the film package 14-2 that faces the side of the electrodes part. Because the rest of the structure is the same as that of the electric double-layer capacitor 10 shown in FIGS. 1-4, the same notations are used for the same or like parts, and the descriptions therefor are not repeated here.

In the electric double-layer capacitor 10-3, because of the distance L between the side wall of the electrodes part 11 and the farthest inner wall of the film package 14-2 facing the side of the electrodes part, even if a stress due to a thermal expansion/contraction of the armor 16 itself during the reflow soldering process is applied to the film package 14-2, such a stress can be absorbed by the gap L filled with the electrolyte 15. Therefore, it is possible to prevent the occurrence of cracks and deformation that may have resulted if the stress were to be directly applied to the electrodes part 11.

Fourth Modification

Figure 8:
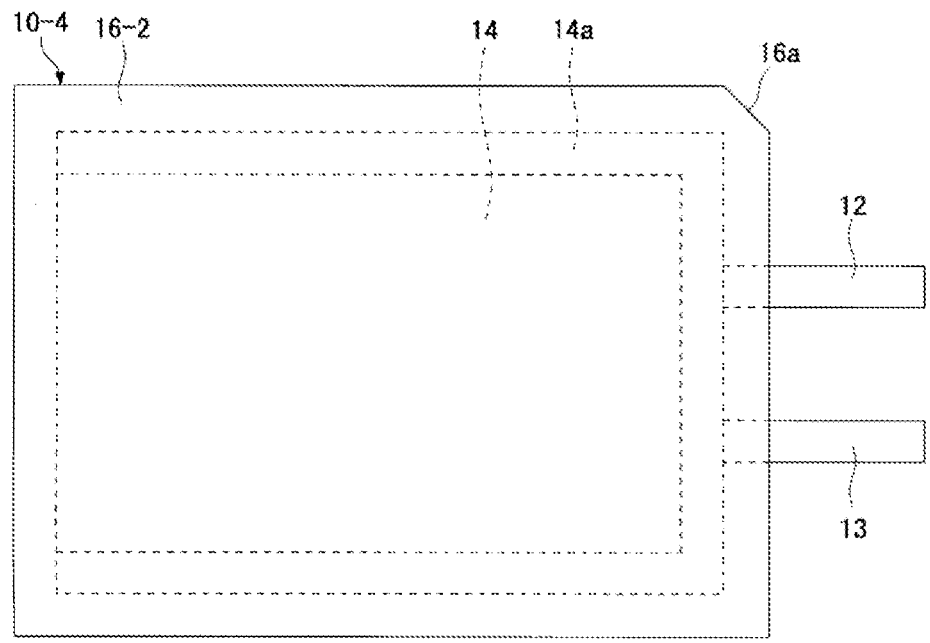
FIG. 8 is a plan view of a fourth modification of the embodiment.

FIG. 8 shows a fourth modification of the embodiment. This figure is a plan view of an electric double-layer capacitor, viewed in the same manner as in FIG. 1.

An electric double-layer capacitor 10-4 shown in FIG. 8 has a structure different from that of the electric double-layer capacitor 10 shown in FIGS. 1-4 in that a chamfer-shape direction indicator 16a is formed on a side of an armor 16 on which the positive terminal 12 and the negative terminal 13 are exposed. By using a direction indicator 16a, the directional properties of a pair of terminals (the polarity, for example) can be readily recognized. Because the rest of the structure is the same as that of the electric double-layer capacitor 10 shown in FIGS. 1-4, the same notations are used for the same or like components, and the descriptions therefor are not repeated here.

In the electric double-layer capacitor 10-4, because the front/rear directions can be readily recognized by the pair of terminals extruding from the armor 16, and the directional properties of the terminals (the polarity, for example) can be readily recognized by the direction indicator 16a, the direction of terminals (the polarity, for example) can be effectively determined when mounting the electric double-layer capacitor 10-4 onto a circuit board or the like.

Fifth Modification

Figure 9:
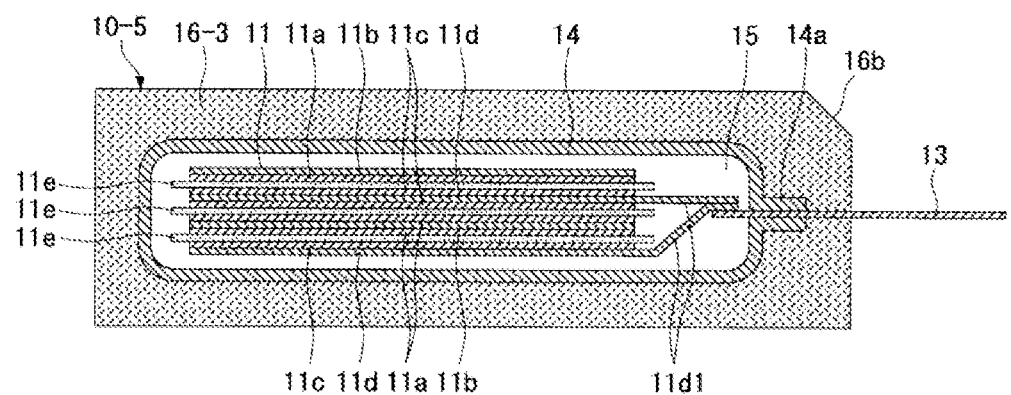
FIG. 9 is a cross-sectional view of an electric double-layer capacitor according to a fifth modification of the embodiment, taken in the same manner as in FIG. 2.

FIG. 9 shows a fifth modification of the embodiment. This figure is a cross-sectional view of an electric double-layer capacitor, taken in the same manner as in FIG. 2.

An electric double-layer capacitor 10-4 shown in FIG. 9 has a structure different from that of the electric double-layer capacitor 10 shown in FIGS. 1-4 in that a chamfer-shape direction indicator 16b is formed on a side of the armor 16 on which the positive terminal 12 and the negative terminal 13 are exposed so that the upward/downward directions of the electric double-layer capacitor can be readily recognized. Because the rest of the structure is the same as that of the electric double-layer capacitor 10 shown in FIGS. 1-4, the same notations are used for the same or like parts, and the descriptions therefor are not repeated here.

In the electric double-layer capacitor 10-5, because the upward/downward directions can be readily recognized by the direction indicator 16b formed in the armor 16, the upward/downward directions of the electric double-layer capacitor 10-5 can be effectively determined when it is to be mounted on a circuit board or the like via an automated mounting apparatus or the like. In the electric double-layer capacitor 10-5 shown in FIG. 9, the direction indicator 16b is formed in the armor at one location, but the present invention is not limited to such an arrangement. Similar or differing shaped indicators can be provided in more than one locations on the armor, for example. The same is true for the direction indicator 16a described with reference to FIG. 8 above.

In the foregoing explanation, various embodiments/modifications have been described by taking an electric double-layer capacitor having a film package as an example. But, the above-mentioned embodiments and modifications are applicable to other electrochemical devices, such as Lithium ion capacitors, redox capacitors, and Lithium ion batteries, having a film package that is similar to the above-described film package in order to achieve similar or same advantageous effects.

It will be apparent to those skilled in the art that various modification and variations can be made in electrochemical device of the present invention without departing from the spirit or scope of the invention. Thus, it is intended that the present invention cover modifications and variations that come within the scope of the appended claims and their equivalents.

What we claim are:

1. An electrochemical device capable of being mounted by soldering, comprising:
 a film package made of a film;
 an electrodes part encapsulated together with an electrolyte in said film package;
 a pair of terminals, one end of each terminal being connected to said electrodes part and another end of each terminal being exposed to an exterior of said film package; and
 an armor in contact with a substantially entire surface of said film package and in contact with partial surfaces of the exposed ends of said pair of terminals, respectively, to encapsulate said film package, said armor exposing remaining portions of said pair of terminals to an exterior of the armor, said armor being an outermost member of the electrochemical device, exposed to an ambient environment, wherein said armor has a thermal conductivity in a thickness direction that is smaller than a thermal conductivity of said film constituting said film package in a thickness direction, and wherein a thickness and a material of said armor are such that said armor can withstand a solder reflow process to protect the film package therein.

2. The electrochemical device according to claim 1, wherein a thickness of said armor covering a side of one surface of said film package is larger than a thickness of said armor covering a side opposite to said surface of said film package.

3. The electrochemical device according to claim 1, wherein said film package has side edges that are heat-sealed and said side edges have a folded part.

4. The electrochemical device according to claim 1, wherein said film package has side edges that are heat-sealed and said side edges have a part in which a protruding portion of one layer of said film is folded over another layer of said film so that said another layer of said film is wrapped around by said protruded portion.

5. The electrochemical device according to claim 1, wherein a distance is provided between a side wall of said electrodes part and an inner wall of said film package that faces said side of said electrodes part to provide for a stress buffer.

6. The electrochemical device according to claim 1, wherein the armor has a direction indicator indicating an orientation of at least one of the armor and said pair of terminals.

7. The electrochemical device according to claim 1, wherein the armor includes at least one of a ceramics, a metal with surface insulation, and a resin.

8. The electrochemical device according to claim 1, wherein the film constituting the film package includes at least one of a protection layer, a barrier layer, an insulation layer, and a heat-seal layer.

9. The electrochemical device according to claim 1, wherein the armor is configured to withstand a solder reflow temperature to alleviates heat effect onto said film package and its interior that may be otherwise incurred during a solder reflow process.

10. The electrochemical device according to claim 1, wherein said film package has side edges that are heat-sealed and said side edges are entirely encapsulated by the armor.

11. An electrochemical device capable of being mounted by soldering, comprising:

a film package made of a film;

an electrodes part encapsulated together with an electrolyte in said film package;

a pair of terminals, one end of each terminal being connected to said electrodes part and another end of each terminal being exposed to an exterior of said film package; and an armor in contact with a substantially entire surface of said film package and in contact with partial surfaces of the exposed ends of said pair of terminals, respectively, to encapsulate said film package, said armor exposing remaining portions of said pair of terminals to an exterior of the armor, said armor being an outermost member of the electrochemical device, exposed to an ambient environment, wherein said film package has side edges that are heat-sealed and said side edges are entirely encapsulated by the armor and wherein a thickness and a material of said armor are such that said armor can withstand a solder reflow process to protect the film package therein.

12. The electrochemical device according to claim 11, wherein said side edges have a folded part.

13. The electrochemical device according to claim 11, wherein said side edges have a part in which a protruding portion of one layer of said film is folded over another layer of said film so that said another layer of said film is wrapped around by said protruded portion.

14. The electrochemical device according to claim 1, wherein said armor is made of a ceramics.

15. The electrochemical device according to claim 1, wherein said armor is made of a metal with surface insulation.

16. The electrochemical device according to claim 1, wherein said armor is made of a plastic or resin that is molded to a shape of the film package, said armor having a substantially rectangular block shape in its exterior.

17. The electrochemical device according to claim 1, wherein said armor is substantially thicker than said film constituting said film package so that said armor can withstand the solder reflow process to protect the film package therein.

18. The electrochemical device according to claim 17, wherein said armor can withstand the solder reflow process at about 250° C.

* * * * *